United States Patent
Cho et al.

(10) Patent No.: US 10,210,965 B2
(45) Date of Patent: Feb. 19, 2019

(54) METHOD FOR ELECTRICAL CONTACT MATERIALS INCLUDING AG PLATED CNTS

(71) Applicants: LSIS CO., LTD., Gyeonggi-do (KR); Research & Business Foundation SungKyunKwan University, Gyeonggi-do (KR)

(72) Inventors: Wookdong Cho, Gyeonggi-do (KR); Chuldong Moon, Gyeonggi-do (KR); Hyeonjeong Choi, Gyeonggi-do (KR); Wonyoung Kim, Gyeonggi-do (KR); Seunghyun Baik, Gangnam-gu (KR); Dongmok Lee, Gyeonggi-do (KR); Jeonghyun Sim, Gyeonggi-do (KR)

(73) Assignees: LSIS CO., LTD., Anyang-si, Gyeonggi-do (KR); Research & Business Foundation SungKyunKwan University, Suwon-si, Gyeonggi-do (KR)

( * ) Notice: Subject to any disclaimer, the term of this patent is extended or adjusted under 35 U.S.C. 154(b) by 369 days.

(21) Appl. No.: 15/162,471

(22) Filed: May 23, 2016

(65) Prior Publication Data

US 2016/0343463 A1 Nov. 24, 2016

(30) Foreign Application Priority Data

May 22, 2015 (KR) .................. 10-2015-0071929

(51) Int. Cl.
*H01B 1/02* (2006.01)
*C23C 18/44* (2006.01)
(Continued)

(52) U.S. Cl.
CPC ............. *H01B 1/02* (2013.01); *C22C 1/0425* (2013.01); *C22C 1/0433* (2013.01);
(Continued)

(58) Field of Classification Search
None
See application file for complete search history.

(56) References Cited

U.S. PATENT DOCUMENTS 9,570,207 B2 2/2017 Park et al.
2003/0054094 A1 3/2003 Itabashi et al.
(Continued)

FOREIGN PATENT DOCUMENTS

CN 1256450 A 6/2000
CN 1256450 A 12/2004
(Continued)

OTHER PUBLICATIONS

Extended European Search Report for Application No. 16164655 dated Oct. 17, 2016, in 11 pages.
(Continued)

*Primary Examiner* — Shamim Ahmed
*Assistant Examiner* — Bradford M Gates
(74) *Attorney, Agent, or Firm* — K&L Gates LLP

(57) ABSTRACT

In some embodiments, the effect of uniformly dispersing carbon nanotubes in the material is achieved by including Ag in the carbon nanotubes to suppress the aggregation of carbon nanotubes when the electrical contacts are prepared.

10 Claims, 5 Drawing Sheets

(51) Int. Cl.

| | |
|---|---|
| *H01B 1/04* | (2006.01) |
| *C23C 18/16* | (2006.01) |
| *C23C 18/18* | (2006.01) |
| *C23C 18/42* | (2006.01) |
| *C22C 1/04* | (2006.01) |
| *C22C 5/06* | (2006.01) |
| *C22C 47/04* | (2006.01) |
| *C22C 47/14* | (2006.01) |
| *C22C 49/02* | (2006.01) |
| *C22C 49/14* | (2006.01) |
| *H01H 1/027* | (2006.01) |
| *B82Y 25/00* | (2011.01) |
| *B82Y 40/00* | (2011.01) |
| *H01H 1/023* | (2006.01) |

(52) U.S. Cl.
CPC .............. *C22C 1/0466* (2013.01); *C22C 5/06* (2013.01); *C22C 47/04* (2013.01); *C22C 47/14* (2013.01); *C22C 49/02* (2013.01); *C22C 49/14* (2013.01); *C23C 18/1635* (2013.01); *C23C 18/1658* (2013.01); *C23C 18/1689* (2013.01); *C23C 18/1692* (2013.01); *C23C 18/1851* (2013.01); *C23C 18/1893* (2013.01); *C23C 18/42* (2013.01); *C23C 18/44* (2013.01); *H01B 1/04* (2013.01); *H01H 1/027* (2013.01); *B22F 2998/10* (2013.01); *B22F 2999/00* (2013.01); *B82Y 25/00* (2013.01); *B82Y 40/00* (2013.01); *H01H 1/023* (2013.01); *H01H 2300/036* (2013.01); *Y10S 977/742* (2013.01); *Y10S 977/847* (2013.01); *Y10S 977/932* (2013.01)

(56) References Cited

U.S. PATENT DOCUMENTS

| | | | |
|---|---|---|---|
| 2009/0114425 A1 | 5/2009 | Lee et al. | |
| 2014/0030532 A1 | 1/2014 | Byun et al. | |
| 2014/0377790 A1* | 12/2014 | Ramaprabhu | G01N 33/54346 435/20 |
| 2015/0155066 A1* | 6/2015 | Park | C22C 5/08 252/503 |

FOREIGN PATENT DOCUMENTS

| | | |
|---|---|---|
| CN | 1624175 A | 6/2005 |
| CN | 101335206 A | 12/2008 |
| CN | 101466598 A | 6/2009 |
| CN | 102324335 A | 1/2012 |
| JP | 2009030100 A | 2/2009 |
| JP | 2015105439 A | 6/2015 |
| KR | 20080090351 A | 10/2008 |
| KR | 20090043020 | 5/2009 |
| KR | 20100040032 A | 4/2010 |
| KR | 20140112662 A | 9/2014 |
| TW | 583336 B | 4/2004 |
| WO | 2008048705 A2 | 4/2008 |
| WO | 2014173793 A1 | 10/2014 |

OTHER PUBLICATIONS

S. Chantaramanee; S. Wisutmethangoon; L. Sikong; T. Plookphol; Title: Development of a lead-free composite solder from Sn—Ag—Cu and Ag-coated carbon nanotubes; Published online: May 31, 2013, Published by: SpringerLink; Journal of Materials Science: Materials in Electronics; vol. 24, pp. 3707-3715; doi:10.1007/s10854-013-1307-y.

Feng, Yi; Yuan, Hailong; Title: Electroless plating of carbon nanotubes with silver; Published May 2004: Published by: Kluwer Academia Publishers; Source: Journal of Materials Science, vol. 39 ( May 2004) pp. 3241-3243.

Niraj Nayan; S.V.S. Narayana Murty; S.C. Sharma; K. Sreekumar; P.P. Sinha; Title: Electroless coating of Silver on Multiwall Carbon Nanotubes; Published online: Jan. 24, 2012; Materials Science Forum; ISSN: 1662-9752, vol. 710, pp. 774-779; doi: 10.4028/www.scientific.net/MSF.710.774; Published by: Trans Tech Publications, Switzerland.

Office Action dated May 23, 2017 for Japanese Patent Application No. 2016-085849, 1 page.

Korean Office Action dated Jun. 13, 2016 in 9 pages.

Oh, Youngseok; Suh, Daewoo; Kim, Youngjim; Lee, Fungsuek; Mok, Jee Soo; Choi, Jaebong; and Baik, Seunghyun; Title: Silver-plated carbon nanotubes for silver/conducting polymer composites; Published by: IOP Publishing; Nanotechnology,19, (2008) 495602 (7pp) (Nov. 19, 2008); doi:10.1088/0957-4484/19/49/495602.

Chinese Office Action for related Chinese Application No. 201610340703.8; action dated Nov. 16, 2017; (7 pages).

Chinese Office Action for related Chinese Application No. 201610340703.8; action dated Jun. 12, 2018; (6 pages).

* cited by examiner

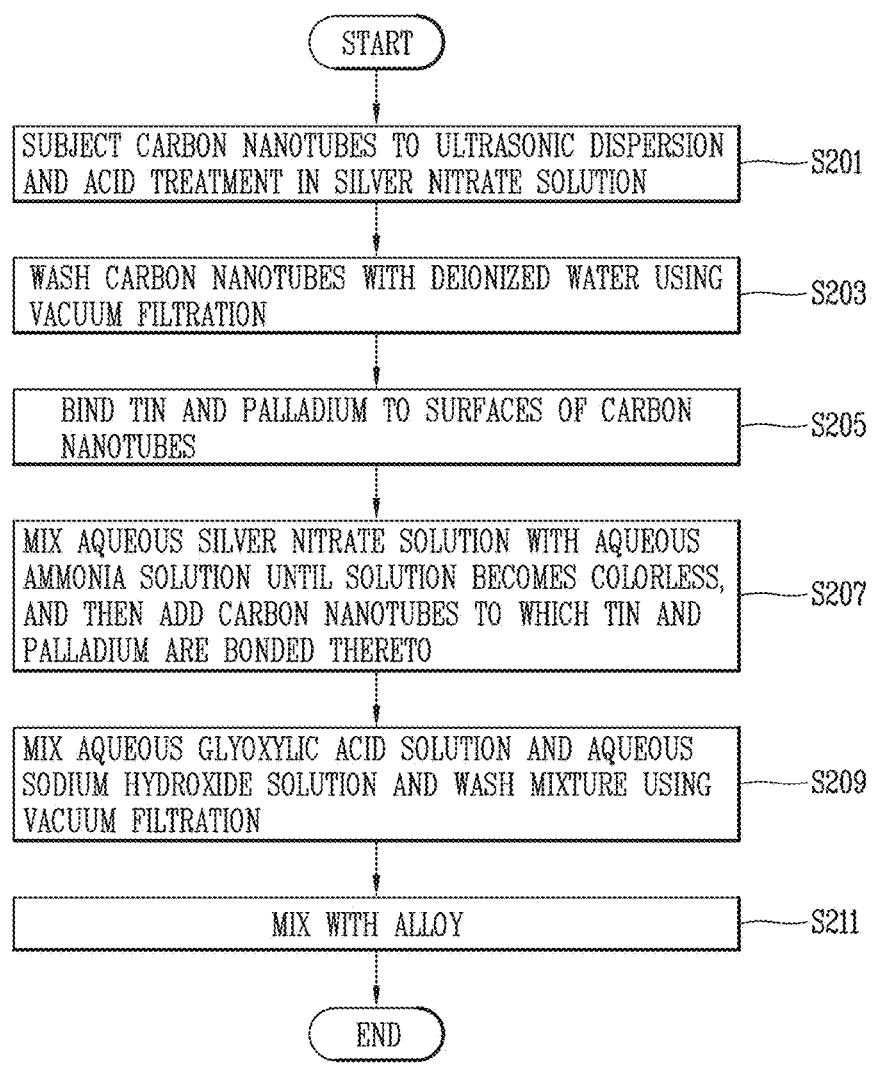

METHOD FOR ELECTRICAL CONTACT MATERIALS INCLUDING AG PLATED CNTS

CROSS-REFERENCE TO RELATED APPLICATION

This application claims the benefit of Korean Application No. 10-2015-0071929, filed on May 22, 2015, which is incorporated by reference in its entirety.

BACKGROUND

1. Technical Field

The present disclosure relates to a method for preparing electrical contact materials including Ag plated carbon nanotubes (CNTs), and more particularly, to a method for preparing electrical contact materials including Ag plated CNTs, which allows the materials to have excellent properties while reducing the content of silver.

2. Background

In general, electrical contact materials are contact elements for electrical conduction used at a portion contacted when an electric circuit is opened or closed in an electric device such as a circuit breaker or a switch, and are applied to motor switches, switch gears, MCBs, compact motors and lamps, automobiles, electric home appliances, and the like.

Further, the electrical contact materials require various properties such as high melting point, excellent electrical conductivity and thermal conductivity, low contact resistance, excellent welding resistance, smooth opening and closing, high hardness related to abrasion resistance, and small deformation in a contact surface.

The electrical contact materials may be divided into contact materials for low current (1 A or less), contact materials for intermediate current (1 A to 600 A), and contact materials for high current (600 A or more).

In general, materials having excellent electrical conductivity are used as the electrical contact materials for low current, materials having excellent electrical conductivity, high abrasion resistance, high melting point, and the like are used as the electrical contact materials for intermediate current, and materials having high melting point are used as the electrical contact materials for high current.

Further, the electrical contact materials may also be divided into tungsten based electrical contact materials, silver-oxide based electrical contact materials, and precious metal based electrical contact materials.

Among them, as illustrated in FIG. 1, when electrical contact materials are prepared using a silver-nickel alloy, silver with a content of about 8 wt % or more has been currently used when silver-nickel based electrical contact materials are used for low current and intermediate current.

Recently, an electrical contact material prepared by adding a carbon based compound to a metal has been proposed in order to improve abrasion resistance, electrical properties and the like of the electrical contact material, and Chinese Patents Nos. 102324335, 001624175 and 001256450 have disclosed electrical contact materials including Ag powder and carbon nanotubes.

However, the electrical contact materials in the related art as described above include CNTs to improve electrical characteristics of the electrical contact materials, but still have high contents of silver (Ag), so that there are problems in that preparation costs are increased and preparation processes are complicated.

SUMMARY

Therefore, an aspect of some embodiments is to provide a method for preparing electrical contact materials including Ag plated carbon nanotubes, which allows the materials to have excellent properties while reducing the content of silver.

To achieve these and other advantages and in accordance with the purpose of some embodiments disclosed in this specification, as embodied and broadly described herein, there is provided a method for preparing electrical contact materials including Ag plated carbon nanotubes, the method including: (a) putting carbon nanotubes into a silver nitrate solution and subjecting the carbon nanotubes to ultrasonic dispersion and acid treatment; (b) washing the carbon nanotubes subjected to ultrasonic dispersion and acid treatment in step (a); (c) binding tin and palladium to surfaces of the carbon nanotubes by subsequently mixing the washed carbon nanotubes with a mixed solution of tin chloride and hydrochloric acid and a mixed solution of palladium chloride and hydrochloric acid, and then each applying ultrasonic wave thereto; (d) putting an aqueous silver nitrate solution and an aqueous ammonia solution into a container and mixing the resulting solution until the solution becomes colorless, and then mixing the carbon nanotubes prepared in step (c) with the solution; (e) preparing Ag plated carbon nanotubes by mixing an aqueous glyoxylic acid solution with an aqueous sodium hydroxide solution, and then washing the resulting nanotubes with deionized water; and (f) preparing a powder mixture by mixing the Ag plated carbon nanotubes with an alloy where the metals are mixed.

Further, the metals constituting the alloy mixed with the carbon nanotubes in step (f) are characterized to have a conductivity of 14.3 MS/m or more.

In addition, the alloy is composed of one or more metals selected from the group consisting of copper, nickel and gold.

Furthermore, the method further includes, after step (f), subjecting the powder mixture to ultrasonic dispersion, and vacuum drying the powder mixture; and (h) sintering the vacuum-dried powder mixture.

Further, step (b) is characterized in that the carbon nanotubes are washed until being reached at pH 7

In addition, step (e) is characterized in that the aqueous glyoxylic acid solution and the aqueous sodium hydroxide solution are mixed until being reached at pH 9

Furthermore, the aqueous glyoxylic acid solution and the aqueous sodium hydroxide solution are characterized to be washed with deionized water until being reached at pH 7

Further, step (a) is characterized in that the carbon nanotubes are subjected to ultrasonic dispersion for 5 minutes and to acid treatment for 2 hours.

In addition, step (e) is characterized in that the aqueous glyoxylic acid solution and the aqueous sodium hydroxide solution are reacted with each other at 90° C. for 1 hour when the solutions are mixed.

Furthermore, step (h) is characterized to be performed by a spark plasma sintering method.

To achieve these and other advantages and in accordance with the purpose of some embodiments of the present disclosure, as embodied and broadly described herein, there is also provided a method for preparing electrical contact materials including Ag plated carbon nanotubes, the method including: (a) subjecting carbon nanotubes to ultrasonic dispersion and acid treatment, and then binding tin and palladium to surfaces of the carbon nanotubes; (b) mixing an aqueous glyoxylic acid solution with an aqueous sodium hydroxide solution, and then mixing the carbon nanotubes prepared in step (a) with the solution; and (c) preparing Ag plated carbon nanotubes by mixing an aqueous glyoxylic acid solution with an aqueous sodium hydroxide solution, and then preparing a powder mixture by mixing the Ag plated carbon nanotubes with an alloy where the metals are mixed.

Furthermore, the metals constituting the alloy mixed with the carbon nanotubes in step (c) are characterized to have a conductivity of 14.3 MS/m or more.

Further, the alloy is composed of one or more metals selected from the group consisting of copper, nickel and gold In addition, the method further includes, after step (c), (d) subjecting the powder mixture to ultrasonic dispersion, and vacuum drying the powder mixture; and (e) sintering the vacuum-dried powder mixture.

As described above, the method for preparing electrical contact materials including Ag plated carbon nanotubes, which is some embodiments of the present disclosure, has an effect of uniformly dispersing carbon nanotubes in the material by including Ag in the carbon nanotubes to suppress the aggregation of carbon nanotubes when the electrical contacts are prepared.

Furthermore, there is an effect of reducing the overall preparation costs by reducing the content of Ag used for the electrical contact materials.

Further, there is an effect of greatly improving the functions of a circuit breaker and the like in which the electrical contact materials are used by allowing the electrical contact materials to have excellent properties while using a small amount of Ag in the carbon nanotubes.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings:

FIG. 9 is a flowchart illustrating the process of preparing the Ag plated carbon nanotubes according to some embodiments of the present disclosure.

DETAILED DESCRIPTION

Hereinafter, a method for preparing electrical contact materials including Ag plated carbon nanotubes according to embodiments of the present disclosure will be described in detail with reference to the accompanying drawings.

Figure 1:
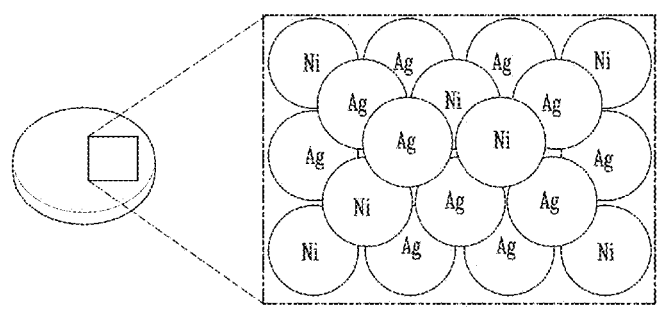
FIG. 1 is a configuration view illustrating a silver-nickel based electrical contact material in the prior art.
Figure 2:
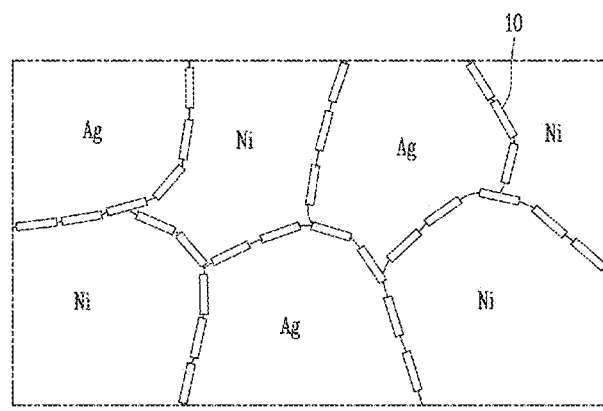
FIG. 2 is a configuration view illustrating the state where the electrical contact material according to some embodiments of the present disclosure includes Ag plated carbon nanotubes.
Figure 3:
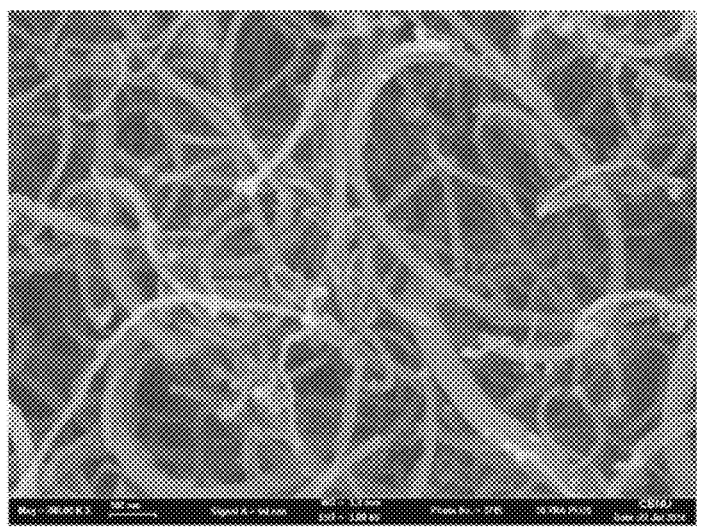
FIG. 3 is a SEM image illustrating carbon nanotubes included in the electrical contacts according to some embodiments of the present disclosure.
Figure 4:
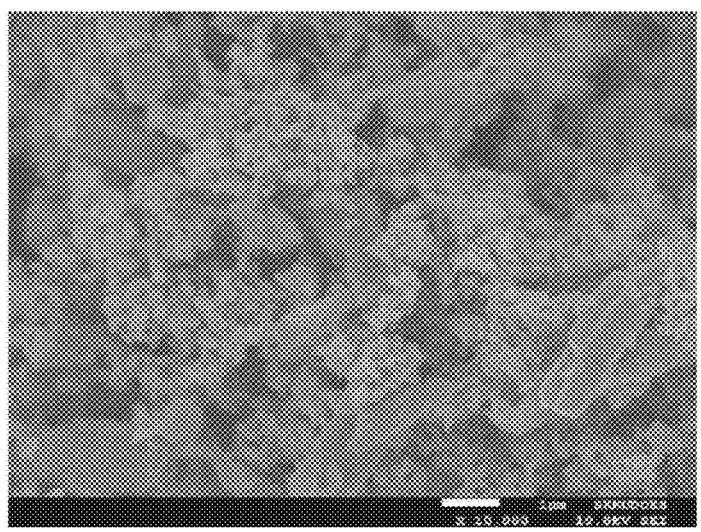
FIG. 4 is a SEM image illustrating Ag plated carbon nanotubes included in the electrical contacts according to some embodiments of the present disclosure.
Figure 5:
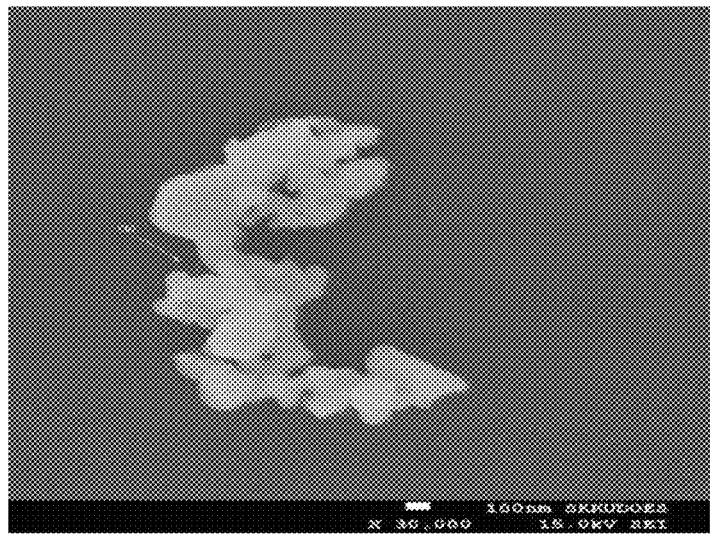
FIG. 5 is a SEM image illustrating Ag plated carbon nanotubes included in the electrical contacts according to some embodiments of the present disclosure.

FIG. 2 is a configuration view illustrating the state where the electrical contact material according to some embodiments of the present disclosure includes Ag plated carbon nanotubes, FIG. 3 is a SEM image illustrating carbon nanotubes included in the electrical contacts according to some embodiments of the present disclosure, FIG. 4 is a SEM image illustrating Ag plated carbon nanotubes included in the electrical contacts according to some embodiments of the present disclosure, and FIG. 5 is a SEM image illustrating Ag plated carbon nanotubes included in the electrical contacts according to some embodiments of the present disclosure.

Figure 6:
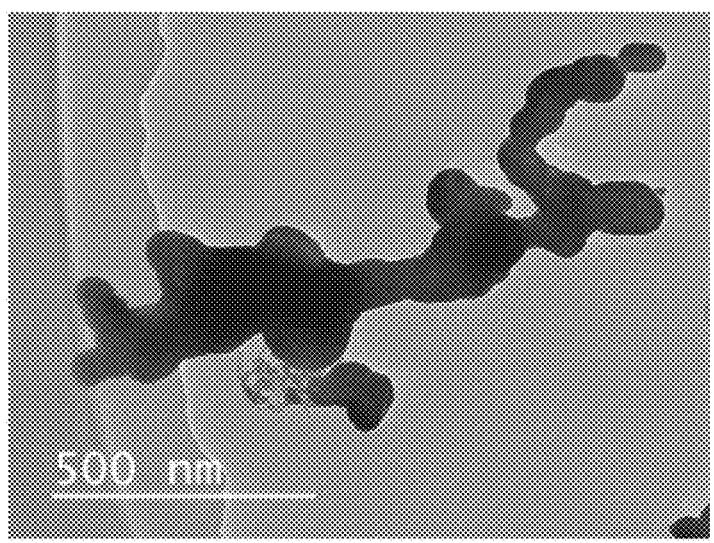
FIG. 6 is a TEM image illustrating Ag plated carbon nanotubes included in the electrical contacts according to some embodiments of the present disclosure.
Figure 7:
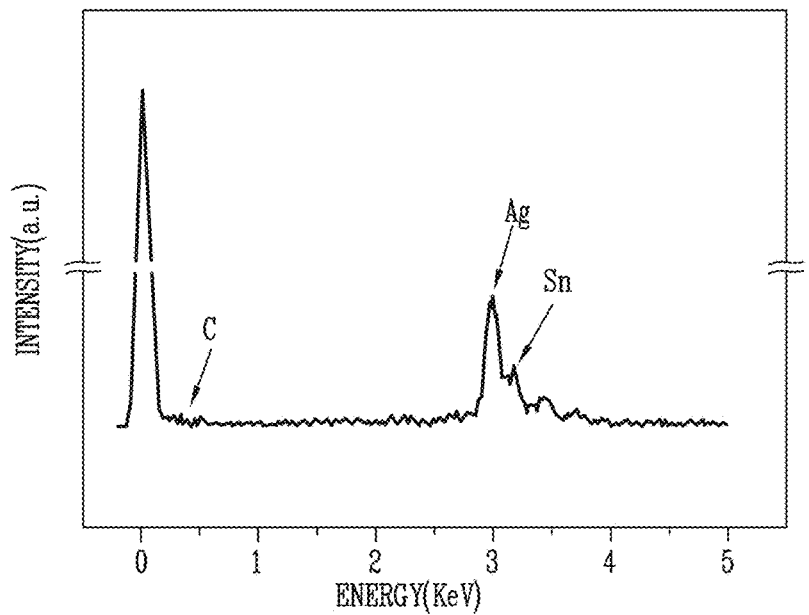
FIG. 7 is an EDS analysis of Ag plated carbon nanotubes included in the electrical contacts according to some embodiments of the present disclosure.
Figure 8:
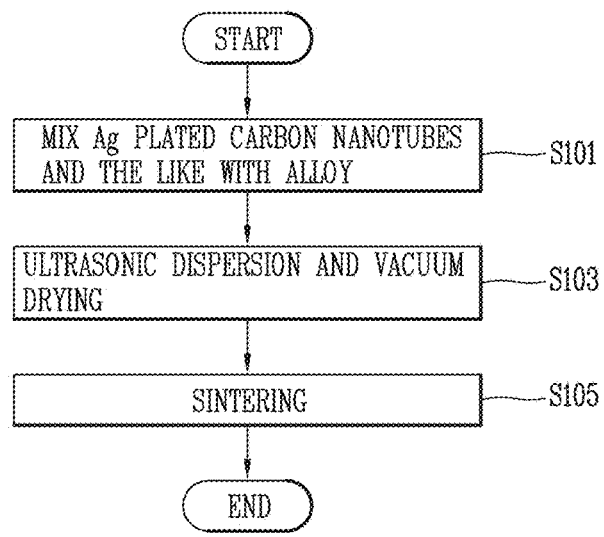
FIG. 8 is a flowchart illustrating the process of preparing the electrical contact material according to some embodiments of the present disclosure.

Further, FIG. 6 is a TEM image illustrating Ag plated carbon nanotubes included in the electrical contacts according to some embodiments of the present disclosure, FIG. 7 is an EDS analysis of Ag plated carbon nanotubes included in the electrical contacts according to some embodiments of the present disclosure, FIG. 8 is a flowchart illustrating the process of preparing the electrical contact material according to some embodiments of the present disclosure, and FIG. 9 is a flowchart illustrating the process of preparing the Ag plated carbon nanotubes according to some embodiments of the present disclosure.

As illustrated in FIG. 2, the electrical contact material prepared by the preparation method according to some embodiments of the present disclosure includes Ag plated carbon nanotubes 10.

In this case, the electrical contact material is composed so as to include one or more metals selected from the group consisting of silver (Ag), copper (Cu), nickel (Ni), and gold (Au), and the silver (Ag), the copper (Cu), the nickel (Ni), and the gold (Au) may improve the density, electrical conductivity, hardness, thermal conductivity, elongation ratio, and electrical lifetime of an electrical contact material to be described below by using those having a conductivity of 63 MS/m, 59 MS/m, 14.3 MS/m, and 45.2 MS/m or more, respectively.

Silver (Ag) has excellent electrical conductivity and thermal conductivity, and low contact resistance, and thus is frequently used as a base material of electrical contact materials, and nickel (Ni) has lower electrical conductivity and thermal conductivity than those of silver (Ag), but has high mechanical strength, and thus is used as an electrical contact material along with silver (Ag).

In this case, it is preferred that the metal particles have a size of 1 μm to 10 μm.

Further, the content of silver (Ag) in a silver-nickel based alloy is not particularly limited, but is preferably 55 wt % to 65 wt %. When the content is less than 55 wt %, the silver-nickel based alloy may not be used as an electrical contact material due to the low electrical conductivity, and when the content is more than 65 wt %, the abrasion resistance and consumption resistance deteriorate and the preparation costs are greatly increased.

Accordingly, the content of nickel (Ni) is preferably 35 wt % to 45 wt %. The carbon nanotube (CNT) is a new material in which carbon atoms are connected to one another through sp2 bonding to form a hexagonal honeycomb structure and have a tubular shape, and the diameter of the CNT is approximately in the range of several to several tens nanometers (nm).

The CNT has excellent electrical, mechanical and thermal properties, and thus may be used as a reinforcing material of a composite material, and serves as an electrical bridge, and thus may improve electrical and mechanical properties of the electrical contact material.

In spite of the advantages described above, the CNT has problems including difficulty in dispersion, and the like when bonded to metal.

That is, when carbon nanotubes (CNTs) are used in an electrical contact material, there is a problem in that it is difficult to uniformly disperse carbon nanotubes in the material due to aggregate between the carbon nanotubes, and there is a problem in that the material properties are affected by the non-uniform dispersion.

Therefore, some embodiments of the present disclosure allows carbon nanotubes to be uniformly dispersed in an electrical contact material by preparing the material using silver (Ag) plated carbon nanotubes.

That is, as illustrated in FIG. 2, when silver (Ag) plated carbon nanotubes are used, the carbon nanotubes are uniformly dispersed at the interface between the materials, and thus improve the thermal conductivity and abrasion resistance required at the electrical contacts.

As illustrated in FIGS. 3 to 7, the state of the carbon nanotube (CNT) or the carbon nanotube (CNT) including silver (Ag) is confirmed by using a transmission electron microscope (TEM) or a scanning electron microscope (SEM), and as illustrated in FIG. 7, the intensity is clearly shown when each component is detected.

Hereinafter, the process of preparing Ag plated carbon nanotubes will be described in detail with reference to FIGS. 8 and 9.

First, a powder mixture is prepared by mixing Ag plated carbon nanotubes with an alloy including silver and nickel (S101).

In this case, for the Ag plated carbon nanotubes, 0.04 g of carbon nanotubes are put into a 7 M silver nitrate solution, and subjected to ultrasonic dispersion and acid treatment for 5 minutes and 2 hours, respectively (S201).

Thereafter, the ultrasonically dispersed and acid-treated carbon nanotubes through step (S201) are washed with deionized water until being reached at pH 7 by using vacuum filtration (S203).

Thereafter, the washed carbon nanotubes through step (S203) are sequentially mixed with a mixed solution of tin chloride ($SnCl_2$) and hydrochloric acid (HCl) and a mixed solution of palladium chloride ($PdCl_2$) and hydrochloric acid (HCl), and ultrasonic wave is applied thereto, thereby binding tin ($Sn^{2+}$) and palladium ($Pd^{2+}$) to surfaces of the carbon nanotubes (S205).

Thereafter, a 0.3 M aqueous silver nitrate ($AgNO_3$) solution and an aqueous ammonia solution are put into a container and mixed until the solution becomes colorless, and then are mixed with the carbon nanotubes produced in step (S205) (S207).

Thereafter, a 0.1 M aqueous glyoxylic acid solution is mixed with a 0.5 M sodium hydroxide (NaOH) solution until being reached at pH 9, and then the mixed solution is reacted at 90° C. for 1 hour, and then vacuum filtration is used to wash the carbon nanotubes with deionized water until being reached at pH 7, thereby preparing Ag plated carbon nanotubes (S209).

Thereafter, the Ag plated carbon nanotubes are mixed with the alloy, thereby preparing a powder mixture (S211).

Thereafter, the powder mixture prepared in step (S211) is subjected to ultrasonic dispersion and vacuum dried (S103), and then the vacuum-dried powder mixture is sintered (S105).

In this case, the powder mixture is sintered at a temperature of 750° C. to 830° C. for 1 minute while maintaining the temperature, and as the sintering method, a spark plasma sintering (SPS) method is used.

The spark plasma sintering method is a sintering method which uses spark plasma generated between raw material particles as a main heat source by directly applying pulse current to the raw material particles while being compressed in a graphite mold.

By the method, high energy of the spark plasma may be effectively applied to heat diffusion, action of electric fields, and the like.

Further, since a sudden increase in temperature is possible at a relatively low temperature for a short period of time through the spark plasma sintering method, the growth of particles may be controlled, a dense composite may be obtained for a short period of time, and even a material which is difficult to sinter (sintering-difficult material) may be easily sintered.

Experimental Example

TABLE 1

|  | Type of contact | Density | Electrical conductivity | Hardness | Thermal conductivity | Elongation ratio | Electrical lifetime |
| --- | --- | --- | --- | --- | --- | --- | --- |
| Comparative Example | Ag65Ni35 | 9.72 | 57 | 130 | 216.616 | 4 | 87,927 |
| Example | Ag65Ni35 including Ag plated carbon nanotubes | 9.737 | 59.2 | 140 | 227.772 | 7 | 169,266 |

As shown in Table 1, it is shown that in the electrical contact material including Ag plated carbon nanotubes prepared by the preparation method according to some embodiments of the present disclosure, the density, electrical conductivity, electrical lifetime, and the like are greatly improved.

Therefore, in some embodiments of the present disclosure, carbon nanotubes are uniformly dispersed in a material by including Ag in the carbon nanotubes to suppress the aggregation of carbon nanotubes when the electrical contacts are prepared.

In addition, the overall preparation costs are reduced by reducing the content of Ag used in the electrical contact materials.

Furthermore, there are greatly improved the functions of a circuit breaker and the like in which the electrical contact materials are used by allowing the electrical contact materials to have excellent properties while using a small amount of Ag in the carbon nanotubes.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for preparing electrical contact materials comprising Ag plated carbon nanotubes, the method comprising:
   (a) putting carbon nanotubes into a silver nitrate solution and subjecting the carbon nanotubes to ultrasonic dispersion and acid treatment;
   (b) washing the carbon nanotubes subjected to the ultrasonic dispersion and acid treatment in step (a);
   (c) binding tin and palladium to surfaces of the carbon nanotubes by subsequently mixing the washed carbon nanotubes with a mixed solution of tin chloride and hydrochloric acid and a mixed solution of palladium chloride and hydrochloric acid, and then each applying ultrasonic wave thereto;
   (d) putting an aqueous silver (I) nitrate solution and an aqueous ammonia solution into a container and mixing the resulting solution until the solution becomes colorless, and then mixing the carbon nanotubes prepared in step (c) with the solution;
   (e) preparing Ag plated carbon nanotubes by mixing an aqueous glyoxylic acid solution with an aqueous sodium hydroxide solution, and then washing the resulting nanotubes with deionized water; and
   (f) preparing a powder mixture by mixing the Ag plated carbon nanotubes with an alloy where the metals are mixed.

2. The method of claim 1, wherein the metals including the alloy mixed with the carbon nanotubes in step (f) have a conductivity of 14.3 MS/m or more.

3. The method of claim 1, wherein the alloy comprises one or more metals selected from the group consisting of copper, nickel, and gold.

4. The method of claim 1, further comprising:
   (g) subjecting the powder mixture to ultrasonic dispersion, and vacuum drying the powder mixture; and
   (h) sintering the vacuum-dried powder mixture.

5. The method of claim 1, wherein in step (b), the carbon nanotubes are washed until being reached at pH 7.

6. The method of claim 1, wherein in step (e), the aqueous glyoxylic acid solution and the aqueous sodium hydroxide solution are mixed until being reached at pH 9.

7. The method of claim 6, wherein the aqueous glyoxylic acid solution and the aqueous sodium hydroxide solution are washed with deionized water until being reached at pH 7.

8. The method of claim 1, wherein in step (a), the carbon nanotubes are subjected to ultrasonic dispersion for 5 minutes and to acid treatment for 2 hours.

9. The method of claim 1, wherein in step (e), the aqueous glyoxylic acid solution and the aqueous sodium hydroxide solution are reacted with each other at 90° C. for 1 hour when the solutions are mixed.

10. The method of claim 4, wherein step (h) is performed by a spark plasma sintering method.

* * * * *